United States Patent
Huang

(10) Patent No.: US 8,905,061 B2
(45) Date of Patent: Dec. 9, 2014

(54) NEEDLE FILL VALVE

(71) Applicant: So-Mei Huang, Tai Ping (TW)

(72) Inventor: So-Mei Huang, Tai Ping (TW)

( * ) Notice: Subject to any disclaimer, the term of this patent is extended or adjusted under 35 U.S.C. 154(b) by 115 days.

(21) Appl. No.: 13/798,038

(22) Filed: Mar. 12, 2013

(65) Prior Publication Data

US 2014/0261774 A1 Sep. 18, 2014

(51) Int. Cl.
| F16K 31/00 | (2006.01) |
| F16K 31/12 | (2006.01) |
| F16K 21/18 | (2006.01) |
| F16K 31/18 | (2006.01) |
| F16K 31/36 | (2006.01) |
| E03D 1/32 | (2006.01) |
| E03D 1/30 | (2006.01) |

(52) U.S. Cl.
CPC .. *E03D 1/32* (2013.01); *E03D 1/30* (2013.01); *F16K 21/18* (2013.01)
USPC ........ 137/403; 137/414; 137/505.36; 251/46; 251/61.1

(58) Field of Classification Search
CPC ..... F16K 21/18; F16K 47/08; F16K 31/1268; F16K 41/12; E03D 1/32
USPC .......... 251/45, 46, 61.1, 331, 335.2; 137/403, 137/406, 414, 505.36, 863; 92/100; 4/366, 4/367, 414, 415
See application file for complete search history.

(56) References Cited

U.S. PATENT DOCUMENTS

| 2,599,498 | A | * | 6/1952 | Suska | 137/494 |
| 4,720,079 | A | * | 1/1988 | Iizuka et al. | 251/331 |
| 2013/0146157 | A1 | * | 6/2013 | Hsiao | 137/505.39 |
| 2013/0284965 | A1 | * | 10/2013 | Sun, Tung-Hsin | 251/368 |

* cited by examiner

*Primary Examiner* — Eric Keasel
*Assistant Examiner* — Hailey K Do
(74) *Attorney, Agent, or Firm* — Guice Patents PLLC

(57) ABSTRACT

A needle fill valve, in which a bearer is set on the top of a body, the bearer is covered on an upper cover, a front cavity is set on the front side of the bearer, an inner cavity is set on the location corresponding to the front cavity for placing the annular gasket of the sealing plate wrapped a sealing valve pad, and the purpose of fixing the sealing valve pad for preventing being disengaged from the annular gasket is achieved by fastening an upper fixed seat and a lower fixed seat.

4 Claims, 4 Drawing Sheets

NEEDLE FILL VALVE

BACKGROUND OF THE INVENTION

1. Field of the Invention

The present invention relates to a needle fill valve and, more particularly, to a needle fill valve for preventing the valve pad from being disengaged from the needle fill valve of the sealing plate, to thereby ensure proper operation of water inflowing and water sealing and extend the service life.

2. Brief Description of the Related Art

The known technology of the needle fill valve, such as the cited references U.S. Pat. No. 4,180,096, U.S. Pat. No. 3,895,645, U.S. Pat. No. 4,345,619, U.S. Pat. No. 4,240,606 etc., the related technology has been implemented for several years, the structure of this type of fill valve is quite mature substantially. However, the only drawback is that the valve pad 12 may be disengaged easily in the part of the sealing plate 1 (as shown in FIG. 1 and FIG. 2), the problem is due to the combination method of the annular gasket 11 of the sealing plate 1 and the valve pad 12. Since the annular gasket 11 is embedded into the inner groove 122 on the inner side of the inner flange 121 on the top of the valve pad 12, the valve pad 12 made from rubber material may easily cause elastic fatigue at the embedded place after moving up and down under long-term pressure, the valve pad 12 may not be tight around the circumference of the annular gasket 11 and may disengaged from the annular gasket 11, so that the operation of water inflowing and water sealing of the fill valve is out of control.

SUMMARY OF THE INVENTION

In view of this, the inventor finally completed the needle fill valve of the present invention after numerous improvements, namely, the object of the present invention is to provide a needle fill valve for ensuring proper operation of water inflowing and water sealing, to thereby extend the service life.

To achieve the purpose of the present invention, the needle fill valve of the present invention is provided, in which a bearer is set on the top of a body, an upper cover is set on the bearer, a sealing plate is placed inside the cavity between the bearer and the upper cover, wherein:

A longitudinal inlet pipeline is set inside the body, the bearer is located on the top of the body, a front cavity is set on the front side, and a rear cavity is set on the rear side;

the upper cover correspondingly covers the bearer, an inner cavity is set inside thereof, the inner cavity is corresponded to the front cavity and forms a capacity space, a plate holder is set on the rear side of the upper cover, a groove is set inside the plate holder, the groove communicates with the inner cavity, a spacing screw hole and a through hole are set inside the groove, the spacing screw hole is provided for an adjustment bolt to fasten thereon after passing through a first elastic element;

the sealing plate includes:

an annular gasket set in a front side of a plate body, a round hole set on the annular gasket, a spacing hole and a pinhole, the spacing hole provided for the adjustment bolt to pass therethrough, and the pinhole provided for a pinhole pad to pass therethrough;

a sealing valve pad, which is an elastic circular membrane pad, has an inner flange set on a top side thereof, an inner groove concavely set on the inner side of the inner flange for embedding the circumference of the annular gasket;

a lower fixed seat, which is wrapped on the bottom of the annular gasket, has multiple elastic cleats and multiple spacing sheets annularly set on the top side of the lower fixed seat, the elastic cleats and the spacing sheets arranged alternately and protruded vertically upwards above the round hole;

an upper fixed seat has a flange extended downwards from its circumference, the flange is set round the outer edge of the inner flange of the sealing valve pad, an inner round hole and a notch set on the upper fixed seat, the inner round hole provided for the elastic cleats and the spacing sheets to pass therethrough, the spacing sheets butting against the hole edge of the inner round hole, the elastic cleats fastened to the upper fixed seat, and the sealing valve pad fixed by fastening the upper fixed seat and the lower fixed seat.

The above rear cavity has a one-way valve block placed inside thereof, and a water distribution disc is used to cover and locate the one-way valve block. A waterproof pad covers the top of the water distribution disc. The one-way valve block includes a one-way sealing valve, a second elastic element and a spacing seat.

The above plate holder has a water hole set on the outer side thereof.

The above bearer has multiple studs set on the circumference thereof, the studs corresponding to the multiple locking holes set on the circumference of the upper cover for fastening multiple bolts therein.

BRIEF DESCRIPTION OF THE INVENTION

The detail structure, the applied principle, the function and the effectiveness of the present invention can be more fully understood with reference to the following description and accompanying drawings, in which.

DETAILED DESCRIPTION OF THE PREFERRED EMBODIMENTS

Figure 1:
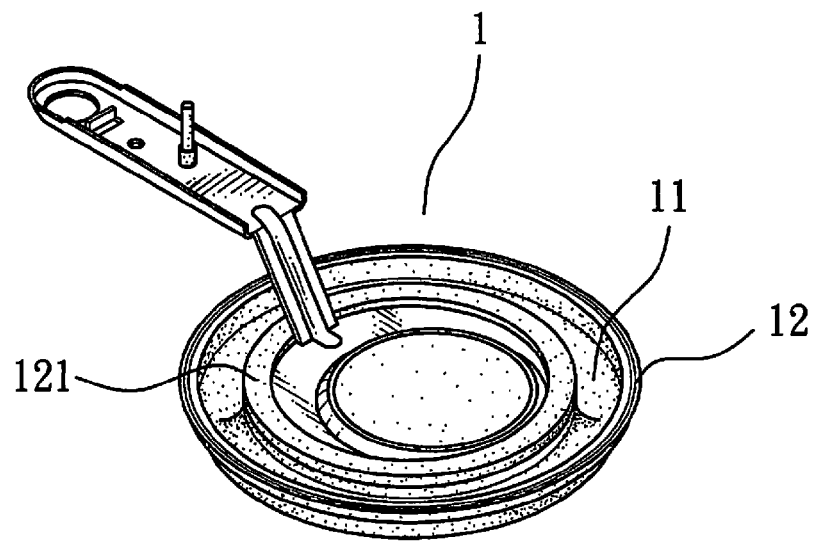
FIG. 1 is a three dimensional diagram of the sealing plate in the prior art.
Figure 2:
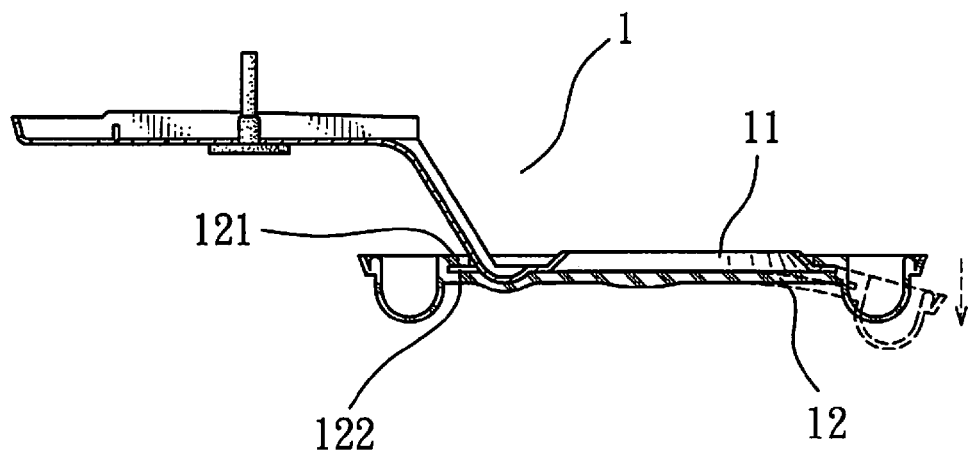
FIG. 2 is a schematic diagram of the sealing valve pad in the disengaged state in the prior art.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

Figure 3:
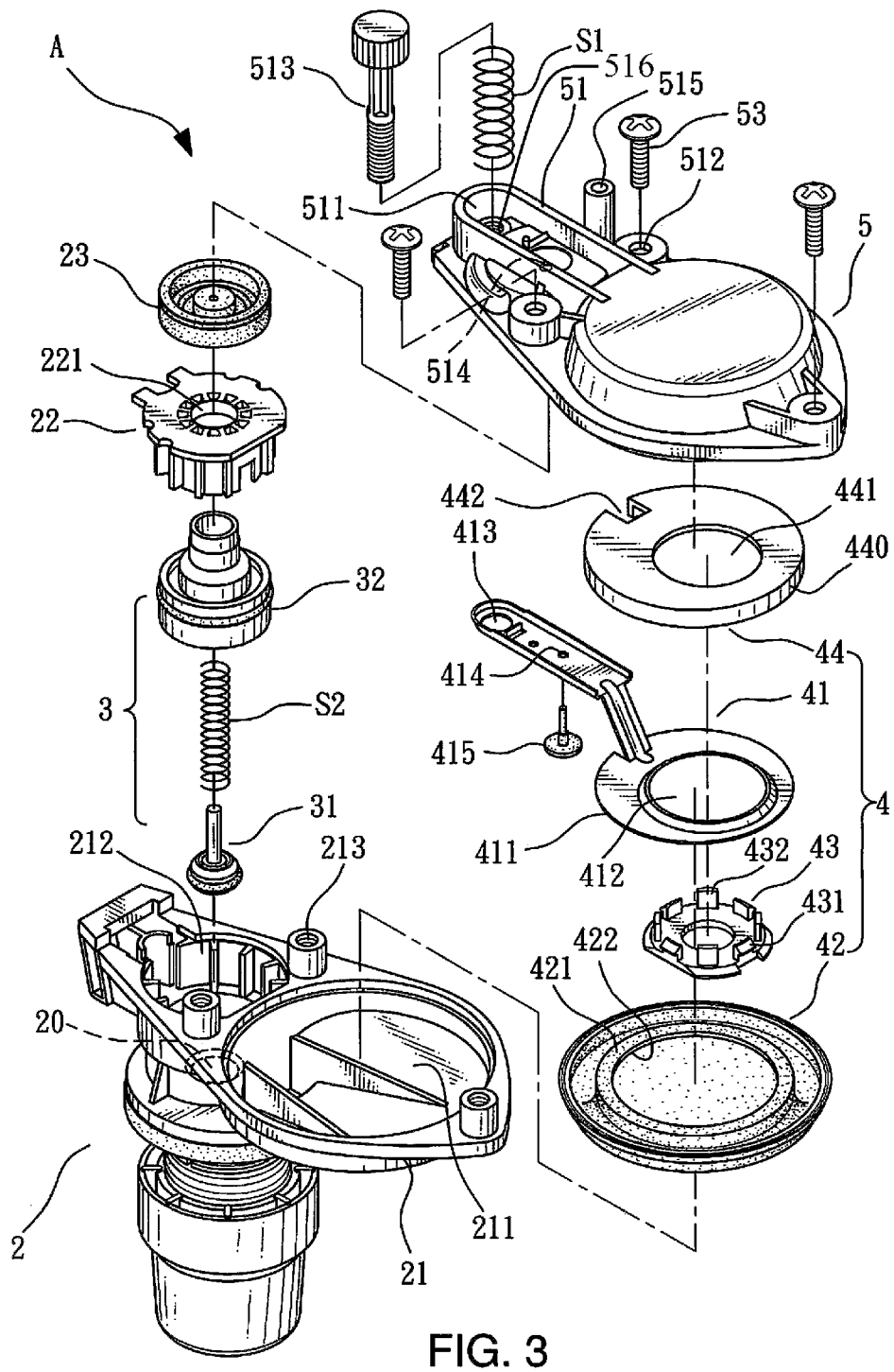
FIG. 3 is an exploded perspective diagram of the present invention.
Figure 4:
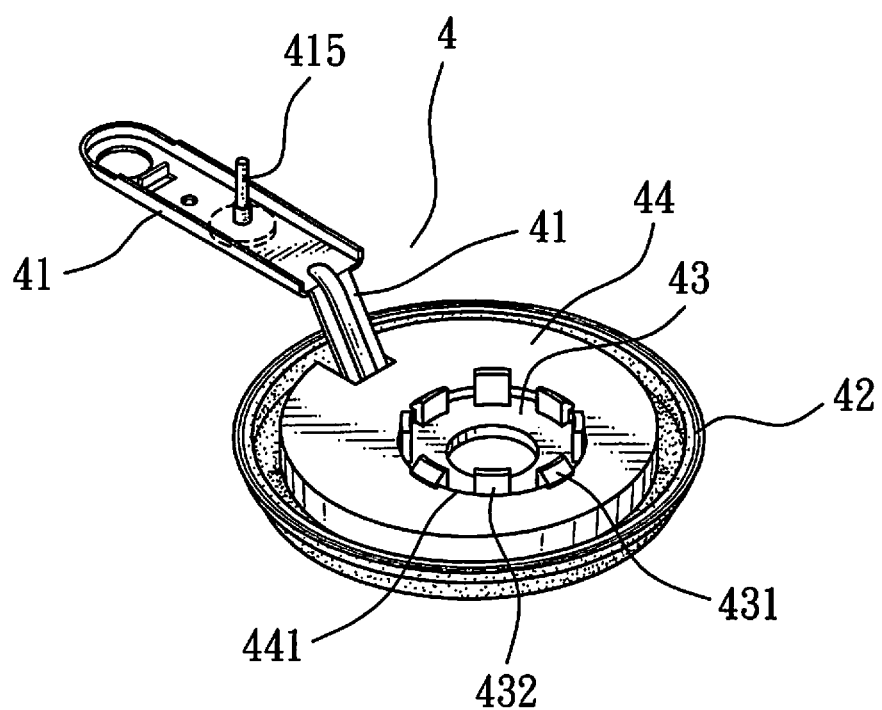
FIG. 4 is a three dimensional diagram of the sealing plate of the present invention.
Figure 5:
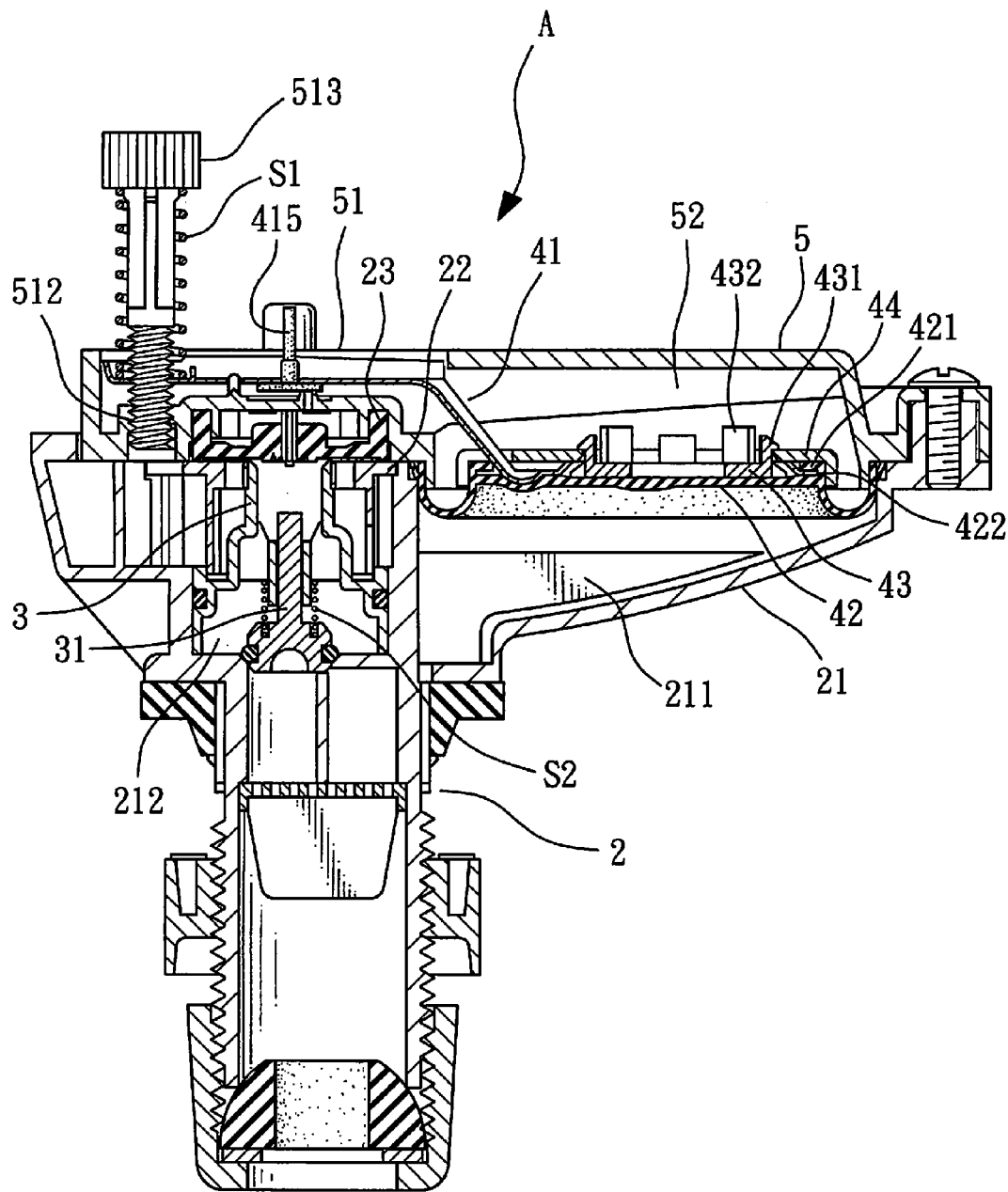
FIG. 5 is a schematic cross sectional diagram of the composition according to the present invention.

Please refer to FIG. 3, FIG. 4 and FIG. 5. The needle fill valve A of the present invention has a bearer 21 is set on the top of a body 2, an upper cover 5 is set on the bearer 21, a sealing plate 4 is placed inside the cavity between the bearer 21 and the upper cover 5, wherein:

a longitudinal inlet pipeline 20 is set inside the body 2, the bearer 21 is located on the top of the body 2, a front cavity 211 is set on the front side and a rear cavity 212 is set on the rear side;

the upper cover 5 correspondingly covers on the bearer 21, an inner cavity 52 is set inside thereof, the inner cavity 52 corresponds to the front cavity 211 and forms a capacity space, a plate holder 51 is set on the rear side of the upper cover 5, a groove 511 is set inside the plate holder 51, the groove 511 is communicated with the inner cavity 52, a spacing screw hole 516 and a through hole 514 are set inside the groove 511, the spacing screw hole 516 is provided for an adjustment bolt 513 to fasten thereon after passing through a first elastic element S1;

the sealing plate 4 includes:

an annular gasket 411 set in the front side of a plate body 41, a round hole 412 set on the annular gasket 411, a spacing hole 413 and a pinhole 414, the spacing hole 413 provided for the adjustment bolt 513 to pass therethrough, and the pinhole 414 provided for a pinhole pad 415 to pass therethrough;

a sealing valve pad 42, which is an elastic circular membrane pad, has an inner flange 421 set on its top side, an inner groove 422 concavely set on the inner side of the inner flange 421 for embedding the circumference of the annular gasket 411;

a lower fixed seat 43, which is wrapped on the bottom of the annular gasket 411, has multiple elastic cleats 431 and multiple spacing sheets 432 annularly set on the top side of the lower fixed seat 43, the elastic cleats 431 and the spacing sheets 432 arranged alternately and protruded vertically upwards above the round hole 412; and an upper fixed seat 44 has a flange 440 extended downwards from its circumference, the flange 440 set round the outer edge of the inner flange 421 of the sealing valve pad, an inner round hole 441 and a notch 442 are set on the upper fixed seat 44, the inner round hole 441 provided for the elastic cleats 431 and the spacing sheets 432 to pass therethrough, the spacing sheets 432 butting against the hole edge of the inner round hole 441, the elastic cleats 431 fastened to the upper fixed seat 44, and the sealing valve pad 42 is fixed by fastening the upper fixed seat 44 and the lower fixed seat 43.

A one-way valve block 3 is placed inside the rear cavity 212 of the above bearer 21, and a water distribution disc 22 is used to cover and locate the one-way valve block 3. A waterproof pad 23 covers the top of the water distribution disc 22. The one-way valve block 3 includes a one-way sealing valve 31, a second elastic element S2 and a spacing seat 32.

The above water distribution disc 22 has a water hole 221 set on the top thereof.

The above upper cover 5 has a water hole 515 set on the outer side of the plate holder 51.

The above bearer 21 has multiple studs 213 set on the circumference thereof, the studs 213 corresponding to the multiple locking holes 512 set on the circumference of the upper cover 44 for fastening multiple bolts 53 therein, thereby fastening the upper cover 5 and the bearer 21.

By the composition of the above elements, in the present invention, when the water tank needs water, water flows into the rear cavity 212 from the inlet pipeline 20 of the body 2, passes through the one-way valve block 3 and the water hole 221, and flows into the water tank from the water hole 515. At this time, water also flows into the inner cavity 52 and presses the sealing valve pad 42. When the water pressure is sufficient (it means that the water flowing into the water tank reaches the set inlet water level), due to the pressure, the pinhole pad 415 pressed by the plate body 41 blocks the through hole 514 by its bottom, the waterproof pad 221 blocks the water hole 221 on the top side of the water distribution disc 22 to form a water-sealing state. And, after flushing, the sealing valve pad 42 is no longer pressed by water pressure and the front side of the sealing plate 4 faces upwards. At this time, the through hole 514 is no longer blocked by the bottom of the pinhole pad 415, and water inflow may be permitted until the set inlet water level is reached.

In the present invention, by the fastening of the upper fixed seat 44 and the lower fixed seat 43, the sealing valve pad 42 is fixed and not disengaged from the annular gasket 411, to ensure properly operation of water inflowing and water sealing, to thereby achieve the purpose of extending the service life of the fill valve.

I claim:

1. A needle fill valve comprising: a bearer set on a top of a body, an upper cover set on the bearer, a sealing plate placed inside a cavity located between the bearer and the upper cover, wherein:

a longitudinal inlet pipeline is set inside the body, the bearer is located on the top of the body, a front cavity is set on a front side and a rear cavity is set on a rear side;

the upper cover, which correspondingly covers the bearer, has an inner cavity set inside, the inner cavity corresponding to the front cavity and forming a capacity space, a plate holder set on the rear side of the upper cover, a groove set inside the plate holder, the groove communicating with the inner cavity, a spacing screw hole and a through hole are set inside the groove, the spacing screw hole provided for an adjustment bolt to fasten thereon after passing through a first elastic element;

the sealing plate includes:

a plate body, an annular gasket set in the front side, a round hole set on the annular gasket, a spacing hole and a pinhole, the spacing hole provided for the adjustment bolt to pass through, and the pinhole provided for a pinhole pad to pass through;

a sealing valve pad, which is an elastic circular membrane pad, has an inner flange set on a top side of the elastic circular membrane pad, an inner groove concavely set on an inner side of the inner flange for embedding the circumference of the annular gasket;

a lower fixed seat, which is wrapped on the bottom of the annular gasket, has multiple elastic cleats and multiple spacing sheets annularly set on a top side of the lower fixed seat, the elastic cleats and the spacing sheets are arranged alternately and protruded vertically upwards above the round hole;

an upper fixed seat has a flange is extended downwards from its circumference, the flange set around an outer edge of the inner flange of the sealing valve pad, an inner round hole and a notch set on the upper fixed seat, the inner round hole provided for the elastic cleats and the spacing sheets to pass therethrough, the spacing sheets butting against a hole edge of the inner round hole, the elastic cleats fastened to the upper fixed seat, and the sealing valve pad fixed by fastening the upper fixed seat and the lower fixed seat.

2. The needle fill valve as claimed in claim 1, wherein a one-way valve block is placed inside the rear cavity, and a water distribution disc is used to cover and locate the one-way valve block; a waterproof pad covers a top of the water distribution disc; and the one-way valve block includes a one-way sealing valve, a second elastic element and a spacing seat.

3. The needle fill valve as claimed in claim 1, wherein a water hole is set on an outer side of the plate holder.

4. The needle fill valve as claimed in claim 1, wherein multiple studs are set on the circumference of the bearer, and the studs are corresponded to the multiple locking holes set on the circumference of the upper cover for fastening multiple bolts.

* * * * *